(12) United States Patent
Michele et al.

(10) Patent No.: US 7,323,023 B2
(45) Date of Patent: Jan. 29, 2008

(54) CYCLONE SEPARATOR

(75) Inventors: Volker Michele, Cologne (DE); Heiko Herold, Neuss (DE); Guenther Sanchen, Grabs (CH)

(73) Assignee: Hilti Aktiengesellschaft, FL-9494 Schaan (LI)

( * ) Notice: Subject to any disclaimer, the term of this patent is extended or adjusted under 35 U.S.C. 154(b) by 417 days.

(21) Appl. No.: 11/009,889

(22) Filed: Dec. 10, 2004

(65) Prior Publication Data
US 2005/0150199 A1 Jul. 14, 2005

(30) Foreign Application Priority Data
Dec. 11, 2003 (DE) ................. 103 58 030

(51) Int. Cl.
B01D 45/12 (2006.01)
B01D 50/00 (2006.01)

(52) U.S. Cl. ............... 55/337; 55/385.1; 55/459.1; 55/467

(58) Field of Classification Search ........ 55/385.1, 55/337, 459.1, 467, DIG. 28; 123/41.65, 123/198 E
See application file for complete search history.

(56) References Cited

U.S. PATENT DOCUMENTS 5,843,211 A * 12/1998 Bielefeldt ............ 95/269
6,681,726 B2 * 1/2004 Linsbauer et al. ....... 123/41.65
6,758,186 B2 * 7/2004 Janoske ............... 123/198 E
6,991,664 B2 * 1/2006 Riehmann et al. ......... 55/321

FOREIGN PATENT DOCUMENTS

| AT | 0383052 | 5/1987 |
|---|---|---|
| DE | 9827173 | 12/1999 |
| DE | 0230590 | 1/2003 |

OTHER PUBLICATIONS

Patent Abstract of Japan JP-2002 282 739A Oct. 2002.

* cited by examiner

*Primary Examiner*—Robert A. Hopkins
(74) *Attorney, Agent, or Firm*—Abelman, Frayne & Schwab

(57) ABSTRACT

A cyclone separator (14) for use in a suction apparatus (4) of a hand-held power tool (2) includes a dirty air inlet (12), a suction ventilator (38) for aspirating, through a suction opening (8) which is connected with the dirty air inlet (12), abrasion particle-carrying suction air, a pure air outlet for letting out purified air, a vortex chamber (16) arranged between the dirty air inlet (12) and the pure air outlet, with the dirty air inlet (12) opening substantially tangentially into the vortex chamber (16) for generating a swirling stream in a direction toward the pure air extraction element (24), a collection chamber (36), and particle outlet having at least two particle outlet openings and connecting the vortex chamber with a collection chamber (36), with the dirty air inlet opening into the vortex chamber between the two particle outlet openings.

5 Claims, 3 Drawing Sheets

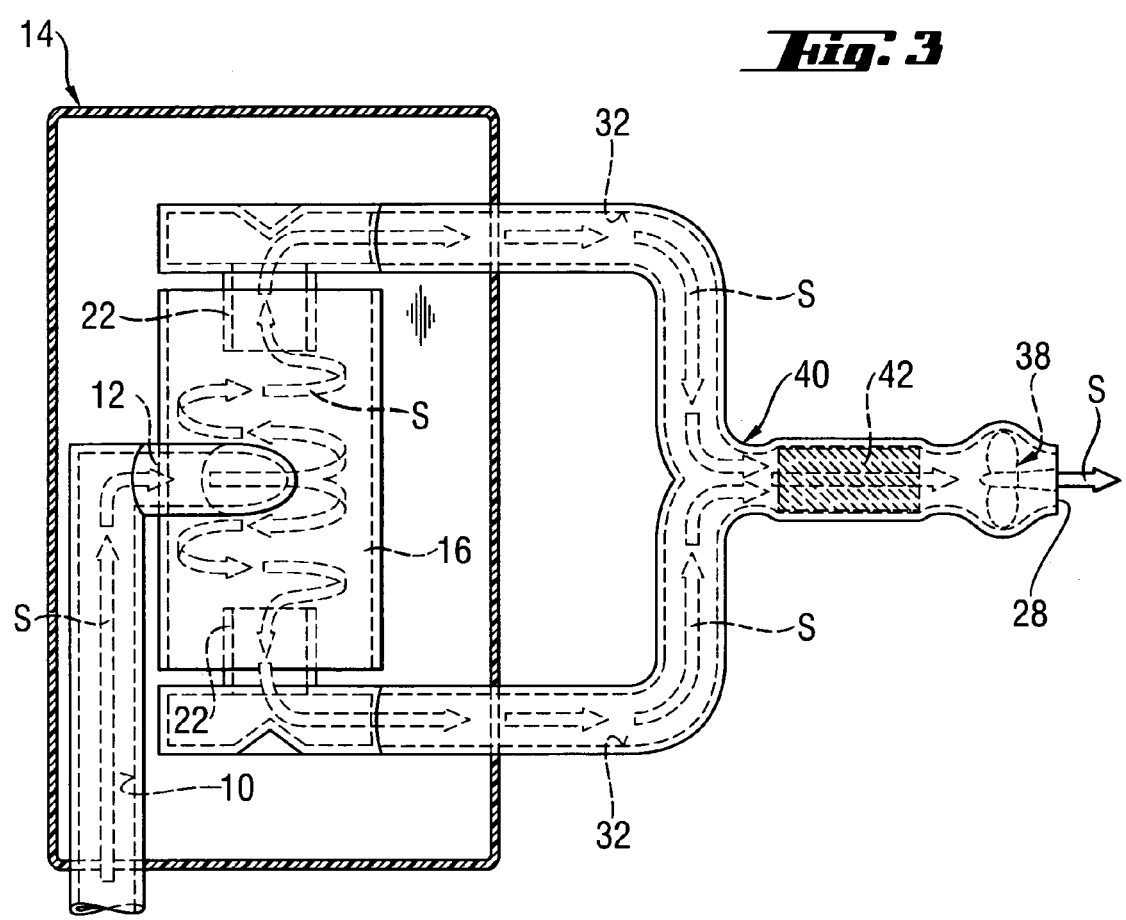

CYCLONE SEPARATOR

BACKGROUND OF THE INVENTION

1. Field of Invention

The present invention relates to a cyclone separator for use in a suction apparatus of a hand-held power tool, in particular of a motor-driven drilling or chiseling tool or of a saw. The cyclone separator includes a dirty air inlet and a suction ventilator for aspirating through suction opening means, which is connected with the dirty air inlet, suction air that carries abrasion particles produced during operation of the hand-held power tool. Further, there is provided a pure air outlet for letting out purified air. A vortex chamber is arranged between the dirty air inlet and the pure air outlet and into which the dirty air inlet opens substantially tangentially. By providing a pure air extractor connected with the pure air outlet, a swirling stream is generated. A particle outlet connects the vortex chamber with a collection chamber.

2. Description of the Prior Art

Cyclone separators of the type described above are used for collecting and disposing abrasion particles, such as drillings, dust particles, saw dust, etc., which are produced during operation of a hand-held power tool. A cyclone separator permits to completely eliminate filters or use them only for fine dust. This, in turn, permits to operate a power tool for a long time without a need to replace filters. The emptying of the collection chamber takes place within large intervals, as its volume is selected to be relatively large.

German Publication DE 198 27 173 discloses a cyclone separator for a hand-held power tool. The separator includes an immersion pipe that projects in a cylindrical chamber in which a vortex is generated. The vortex presses the aspirated abrasion particles against the cylindrical inner wall of the chamber, and the particles move, under the gravity force through an open end side of the chamber into a collection container.

A drawback of the known cyclone separator consists in that it properly functions only when it is oriented in a predetermined direction in space. As soon as the open side of the chamber lies, with reference to the gravity force, above the opening of the immersion pipe, the abrasion particles would not fall into the collection container, rather large particles would move through the immersion pipe to the pure air outlet. Thus, at a particular use of a hand-held tool, e.g., overhead use or bottom use, the separation efficiency of a cyclone separator can be close to a zero.

Accordingly, an object of the present invention is a cyclone separator in which the foregoing drawback is eliminated, and a satisfactory separation is achieved independently of orientation of the separator in space.

SUMMARY OF THE INVENTION

This and other objects of the present invention, which will become apparent hereinafter, are achieved by providing a particle outlet having at least two particle outlet openings, with the dirty air inlet opening into the vortex chamber between the at least two particle outlet openings. As a result of provision of the at least two openings the abrasion particles can move in more that one direction under the action of the gravity force from the vortex chamber. In this way, a satisfactory separation effect is insured for all of the possible directions of orientation of the cyclone separator relative to the gravity force.

According to an advantageous embodiment of the invention, the vortex chamber is formed as a cylindrical chamber, and the two particle outlet openings are provided, respectively, at respective end sides of the cylindrical vortex chamber.

In this way, the particle outlet openings are provided on opposite, with respect to the mouth of the dirty air inlet, sides of the vortex chamber. This insures that at least one of the particle outlet openings would lie at least at the same height as the mouth of the dirty air inlet. The cylindrical shape of the vortex chamber permits to form a stable vortex that insures that almost all of the abrasion particles, which are heavier than air, can closely move along the inner wall of the vortex chamber.

Advantageously, each immersion pipe projects into the vortex chamber in a region of a respective particle outlet opening and forms a pure air extractor and is connected with the pure air outlet. This construction insures a satisfactory separation at the two outlet openings of the abrasion particles which are pressed against the inner wall of the vortex chamber by the swirling stream.

Advantageously, the two immersion pipes are connected with a common pure air outlet opening of the pure air outlet. Thereby, it is possible to provide for a necessary suction stream from the dirty air inlet up to the pure air outlet with a single suction ventilator arranged downstream of the cyclone separator. The advantage of this construction consists in that the pure air passes past the suction ventilator, reducing the danger of the ventilator being damaged and reducing its possible wear.

Advantageously, at least one filter is provided between the immersion pipes and the pure air outlet, whereby the cleaning effect can be increased.

Advantageously, the filter is arranged between a connection section of the immersion pipes and the pure air outlet opening, which permits to clean the total of the to-be-filtered air with a single filter.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 3 a cross-sectional view of a another embodiment of a cyclone separator according to the present invention.

DETAILED DESCRIPTION OF THE PREFERRED EMBODIMENTS

Figure 1:
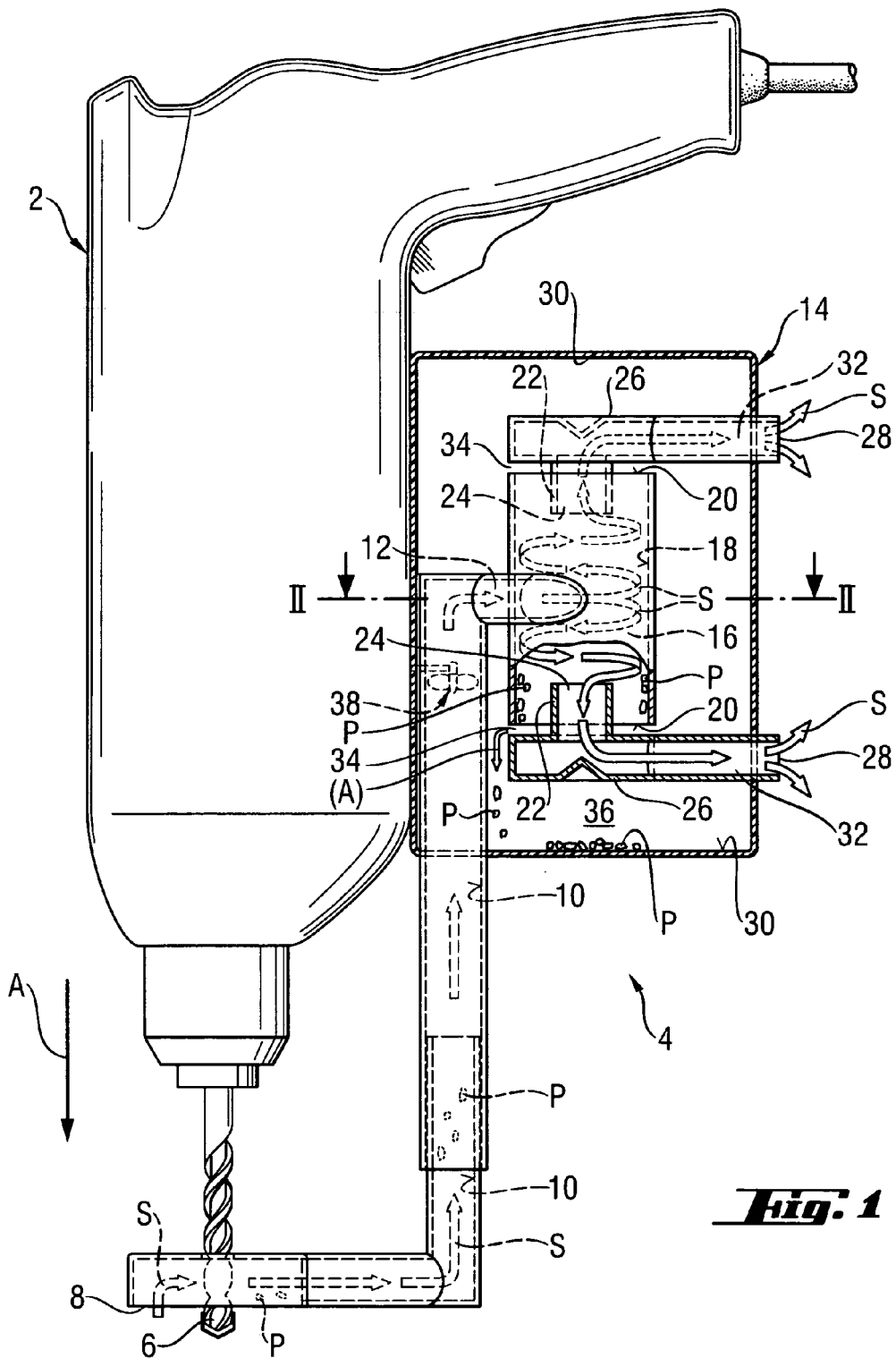
FIG. 1 a side view of a hand-held tool with a cyclone separator according to the present invention shown in a partially cross-sectional view.

FIG. 1 shows a hand-held power tool 2, which is formed as a drilling or chiseling tool, together with a suction apparatus 4 which is releasably or permanently secured to the tool 2. The suction apparatus 4 includes a suction opening element 8 arranged on a working tool 6 that is formed as a drill. The suction opening element 8 is connected by a suction conduit 10 with a dirty air inlet 12 of a cyclone separator 14.

Figure 2:
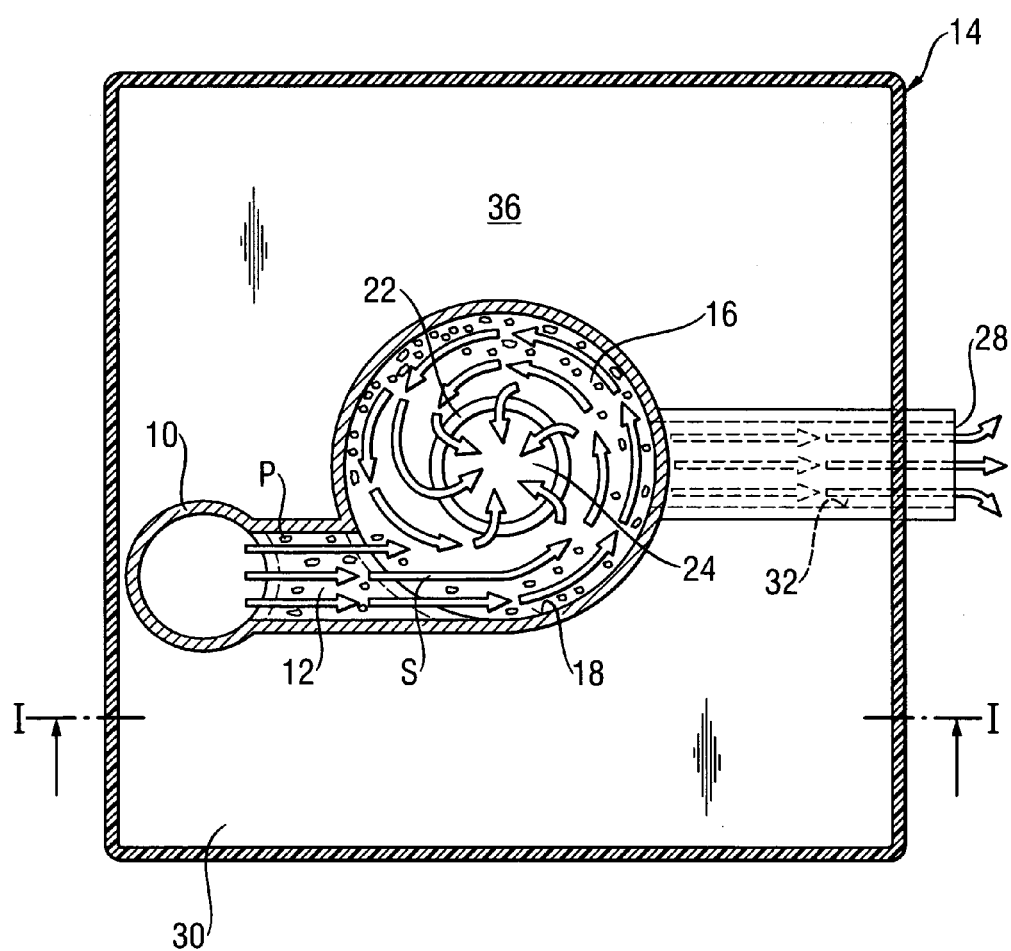
FIG. 2 a cross-sectional view of the inventive cyclone separator shown in FIG. 1 along line II-II in FIG. 1.

The cyclone separator 14 has a cylindrical vortex chamber 16 into which the dirty air inlet 12 opens substantially tangentially to an inner wall 18 of the vortex chamber 16, as particularly shown in FIG. 2.

As further shown in FIG. 1, the vortex chamber 16 has two open end sides 20. At both end sides 20, a respective immersion pipe 22 projects into the vortex chamber 16. Both immersion pipes 22 form at their open end, which project into the vortex chamber 16, a pure air extractor 24 located in the middle of the vortex chamber 16. Both immersion pipes 22 are held by respective covers 26. The covers 26 connect the respective immersion pipes 22 with respective pure air outlet openings 28. Both pure air outlet openings 28 form a pure air outlet.

The pure air outlet (outlet openings 28) is located outside of a receiving reservoir 30. The dirty air inlet 12 is located entirely within the receiving reservoir 30, as are the vortex chamber 16, the immersion pipes 22, and the covers 26. An outlet conduit 32 connects the respective pure air outlet opening 28 with the respective cover 26. Both outlet conduits 32 extend through a wall of the receiving reservoir 30.

Both covers 26 have the same circumference as the vortex chamber 16. Further, both covers 26 are arranged coaxially to the vortex chamber 16 at a small distance from the end sides 20 of the later. As a result, two particle outlet openings 34 in form of an annular slots are formed, respectively, between the vortex chamber 16 and respective covers 26. The outlet openings 34 connect the vortex chamber 16 with a collection chamber 36 which is limited by the receiving reservoir 30.

In order to generate a suction air stream S, which is shown with arrows, from the suction opening element 8 through the cyclone separator 14 to its pure air outlet openings 28, there is provided, in the suction conduit 10 in the embodiment shown in FIG. 1, a suction ventilator 38.

Alternatively, the suction ventilator 38 can be arranged downstream of the vortex chamber 16, as shown in FIG. 3. With this embodiment, both outlet conduits 32 merge into a connection section 40 in order to be able to generate, with a single suction ventilator 38, a suction air stream S through both outlet conduits 32. Additionally, between the connection section 40 and a single pure air outlet opening 28, there is provided a filter 42 shown with dash lines hatching.

For operating the cyclone separator 14, the suction ventilator 38 is actuated. The suction ventilator 38 generates a suction stream S. The suction stream S aspirates the abrasion particles P, which are produced by the working tool 6, through the suction opening element 8 and carries them toward the dirty air inlet 12. Through the dirty air inlet 12, the suction stream 16, together with the abrasion particles P, enters tangentially into the vortex chamber 16. The suction stream S forms, in the vortex chamber 16, a vortex, as shown in FIG. 2. In the vortex chamber 16, the abrasion particles P are pressed, because of their inertia, against the inner wall 18, moving there along. Under the influence of their gravity force the abrasion particles P move along a somewhat helical path in the direction toward the lower end side 20 of the vortex chamber 16. Through the respective particle outlet openings 34, the abrasion particles P fall out of the vortex chamber 16, as shown in FIG. 1, and accumulate in the collection chamber 36. Simultaneously, the air of the suction air stream S, which upon entry into the vortex chamber 16 moves along a helical path to both end sides 20, becomes separated from the abrasion particles P and moves through the pure air extractors 24 into the immersion pipes 22.

In FIG. 1, the hand-held power tool 2 is shown as arranged in a operational direction A, which corresponds to the direction of action of a gravity force, for a case of a ground or floor work. In this case, correspondingly, the abrasion particles P fall from the vortex chamber 16 in the operational direction A. Alternatively, in case of an overhead work, the abrasion particles P move to the particle outlet opening 34 that is located at a side of the vortex chamber 16 remote from the operational direction A. In order to be able to empty the collection chamber 36 from time to time, the receiving reservoir 30 is provided with an appropriate opening device (not shown).

In the immersion pipes 22, the suction air stream S, which becomes free of abrasion particles to a most possible extent, flows, as shown in FIG. 1, through the outlet conduits 32 directly to the pure air outlet openings 28 and into the environment. Alternatively, as shown in FIG. 3, the suction air streams flows, before it exits through the single pure air outlet opening 28, through the filter 42 to additionally remove the smallest particles and dust.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A cyclone separator (14) for use in a suction apparatus (4) of a hand-held power tool (2), comprising a dirty air inlet (12);
   a suction ventilator (38) for aspirating, through suction opening means (8) connected with the dirty air inlet (12), suction air that carries abrasion particle (P) produced during operation of the hand-held power tool (2);
   a pure air outlet for letting out purified air;
   a vortex chamber (16) arranged between the dirty air inlet (12) and the pure air outlet and having a pure air extraction means communicating with the pure air outlet, the dirty air inlet (12) opening substantially tangentially into the vortex chamber (16) for generating a swirling stream in a direction toward the pure air extraction means;
   a collection chamber (26); and
   particle outlet means communicating the vortex chamber (16) with the collection chamber (16) and having at least two particle outlet openings (34), air inlet (2) opening into the vortex chamber (16) between the at least two particle outlet openings (34), wherein an immersion pipe (22) projects into the vortex chamber (16) in a region of a respective particle outlet opening (34) and forms a respective pure air extractor (24) that forms part of the pure air extraction means, and each inmersion pipe (22) is connected with a common pure air outlet opening (28) of the pure air outlet.

2. A cyclone separator according to claim 1, wherein the vortex chamber (16) is a cylindrical chamber, and wherein the two particle outlet openings (34) are provided, respectively, at respective end sides (20) of the cylindrical vortex chamber (16).

3. A cyclone separator according to claim 1, wherein the dirty air inlet (12) opens into the vortex chamber (16) in middle between the at least two particle outlet openings (34).

4. A cyclone separator according to claim 1, comprising a filter (42) arranged between the immersion pipes (22) and the common pure air outlet opening (28).

5. A cyclone separator according to claim 4, wherein the filter (42) is arranged between a connection section (40) of the immersion pipes (22) and the common pure air outlet opening (28).

* * * * *